(12) United States Patent
Jacobs et al.

(10) Patent No.: US 8,173,717 B2
(45) Date of Patent: May 8, 2012

(54) SILICONE FOAMS, PROCESS TO MAKE THEM AND APPLICATIONS THEREOF

(75) Inventors: Paul Jacobs, Croyden (GB); Neil Gemmell, Croyden (GB); Neil Witten, Croyden (GB)

(73) Assignee: Zotefoams PLC., Croyden (GB)

( * ) Notice: Subject to any disclaimer, the term of this patent is extended or adjusted under 35 U.S.C. 154(b) by 353 days.

(21) Appl. No.: 11/814,201

(22) PCT Filed: Jan. 18, 2006

(86) PCT No.: PCT/GB2006/000170
§ 371 (c)(1),
(2), (4) Date: Jul. 18, 2007

(87) PCT Pub. No.: WO2006/077403
PCT Pub. Date: Jul. 22, 2006

(65) Prior Publication Data
US 2009/0286895 A1   Nov. 19, 2009

(30) Foreign Application Priority Data

Jan. 18, 2005   (GB) .................................. 0500986.5

(51) Int. Cl.
*C08G 77/00*   (2006.01)
*C08J 9/00*   (2006.01)
*C08J 9/42*   (2006.01)
*B29C 44/34*   (2006.01)

(52) U.S. Cl. ............................. 521/154; 521/54; 264/51
(58) Field of Classification Search ................... 521/154
See application file for complete search history.

(56) References Cited

U.S. PATENT DOCUMENTS

| | | | | |
|---|---|---|---|---|
| 4,473,665 A | * | 9/1984 | Martini-Vvedensky et al. | 521/79 |
| 4,559,369 A | * | 12/1985 | Bauman et al. | 521/98 |

FOREIGN PATENT DOCUMENTS

| | | | |
|---|---|---|---|
| JP | 09-031233 | * | 2/1997 |
| JP | 09 031233 A | | 2/1997 |
| JP | 10-067039 | * | 3/1998 |
| JP | 10 067039 A | | 3/1998 |

OTHER PUBLICATIONS

Patent Abstracts of Japan, vol. 1997, No. 6, Jun. 1997, and JP 09 031233 (Shin Etsu Polymer Co. Ltd.), Feb. 1997, abstract.
Patent Abstracts of Japan, vol. 1998, No. 8, Jun. 1998, and JP 10 067039 (Shin Etsu Polymer Co. Ltd.), Mar. 1998, abstract.

* cited by examiner

*Primary Examiner* — Randy Gulakowski
*Assistant Examiner* — Kara Negrelli
(74) *Attorney, Agent, or Firm* — Joseph T. Leone, Esq.; Daniel A. Blasiole; DeWitt Ross & Stevens, S.C.

(57) ABSTRACT

Closed cell silicone foams are formed by subjecting a silicone base to an inert gas at an elevated pressure, preferably after a pre-curing step, reducing the pressure to allow the base to expand to produce closed cell silicone foam and curing this expanded foam at an elevated temperature.

13 Claims, No Drawings

SILICONE FOAMS, PROCESS TO MAKE THEM AND APPLICATIONS THEREOF

The present invention relates to silicone foams, processes to make them and applications thereof.

Silicones are synthetic organosilicon polymers based on chains or networks of alternating silicon and oxygen atoms. They are used as electrical insulators, waterproofing agents, rubbers and resins. Silicone foams or sponges are valued for their wide range of operating temperatures, chemical inertness and purity, thermo-acoustic properties, electrical insulating properties, sealing properties and reduced material cost when compared with solid silicone elastomers. The foams may be either open-cell (sponge) or closed-cell, with the closed-cell foams typically being of higher density. Chemical blowing agents are typically used to expand the foam, although there are systems which use volatile organic compounds, water or even hydrogen generated during the curing reaction. The use of chemical blowing agents such as azodicarbonamide results in a poor cell structure (i.e. irregular and uneven cell size), unpleasant odour and discolouration in light coloured materials. They also appear to limit the minimum foam density achievable. Therefore, the challenge has been to produce a low density, closed-cell foam with a consistent, high quality cell structure, low (or no discernible) odour, no discolouration and therefore high purity. A nitrogen saturation process has been discovered and developed to achieve these aims.

JP 09324065 (Shinetsu Polymer Co.) discloses a method of producing a silicone rubber-type cellular material in which a gas is diffused into an uncured silicone composition, lowering the pressure to expand the silicone and heating and pressing the expanded silicone to cure it.

JP 09031233 (Shinetsu Polymer Co.) discloses a method of producing a cellular silicone by impregnating an uncured or semi-cured silicone material with a gas under pressure, lowering the pressure to expand the silicone and under uncured or semi-cured conditions and curing it.

Other silicone foaming processes are disclosed in JP 10067039 and JP 10053663 also in the name of Shinetsu Polymer Co.

The present applicant has made a number of attempts to produce a silicone foam by exposing both cured and uncured silicone materials to inert gas at elevated pressures in an autoclave. It was found that when using cured silicones the material did not expand, although there was some evidence of splitting and cracking in the material. It was also found that when using uncured silicones the material did not expand. However, translucent samples did become opaque, suggesting that some nucleation of structure may have taken place.

It has been discovered that by partially and controllably curing (cure stage 1) the silicone formulation and then saturating the material with nitrogen gas at elevated pressure prior to full foam expansion it is possible to produce a low density, closed-cell foam. Full foam expansion is achieved by rapidly and controllably reducing the gas pressure within the autoclave. At this point the foam produced is dimensionally unstable and must be subjected to a further curing operation (cure stage 2) in order to stabilise dimensions (and thereby the foam density) and prevent collapse of the foamed material. Finally, the dimensionally stable foam may be post-cured (cure stage 3) in an air circulating oven to remove any residual volatiles or reaction products that remain. The finished foam material can be transformed into a variety of different shapes or forms using techniques such as gluing, cutting, routing, punching, stamping and laminating. The foam may also be combined with sheets, films, foams, textiles, reinforcements and other materials known to those skilled in the art, to produce complex sandwich structures by lamination, adhesive bonding, sewing and other fastening techniques.

In accordance with a first aspect of the invention, there is provided a process for making closed cell silicone foam comprising the steps of:
a) subjecting a silicone base to at least one inert gas at a pressure higher than atmospheric in order to drive gas into the composition,
b) reducing the pressure in order to expand the silicone base to produce closed cell silicone foam, and
c) curing the expanded silicone foam (preferably at an elevated temperature).

In a preferred embodiment, the silicone base is partially cured prior to step a).

The foaming process of the invention has been demonstrated as being suitable for a wide range of commercially available grades of silicone elastomers including general purpose grades, low hardness grades, high tear strength grades and grades with enhanced fire performance. It has also been shown that blends of different grades can be used in order to tailor specific properties. The inclusion of various additives, known to those skilled in the art, is also contemplated. These may include pigments, fillers, heat stabilisers, flame retardants, release agents, crepe-hardening inhibitors, and crosslinkers, for example, hydrogen siloxanes. Application areas for these foams are expected to include seals, gaskets, thermal or thermoacoustic insulation, electrical insulation, damping applications and rollers.

In order to produce a low density silicone foam using an autoclave process it has been discovered that it is desirable carefully to select materials and intimately to mix and homogenise the formulation using for example a two-roll mill, internal mixer or other device known to those skilled in the art. The mixture from this first stage may then be further shaped by means of pressure using a hydraulic press and mould system or like equipment into any desired shape, preferably a sheet or plate of regular dimensions. Alternatively, the mixture from the first stage may be provided in a form that is suitable as the feed for an extrusion process. It is further envisaged that the processes of mixing and shaping may be combined in a semi-continuous process such as rubber sheet extrusion or other method known to those skilled in the art.

In order to produce a low density silicone foam from such a sheet precursor it is desirable to introduce a low level of curing or structuring prior to the expansion process. The low level of curing (cure stage 1) may result in chain extension, branching or crosslinking of the polymer chains but is at such a low level that it is difficult to detect by traditional viscometric or rheometric measurements. However it has been determined by experiment that the level of cure in the material at this stage will influence or may even prevent expansion of the final foam. Therefore, it is critical to ensure that the low level of curing (cure stage 1) is accurately controlled in order to minimise process variability and achieve a consistent foam density.

In order to control accurately the low level of curing prior to expansion (cure stage 1), and still be able to cure the material after expansion, formulations using two or more thermally activated peroxides have been found to be successful. In such formulations a small quantity of a peroxide with a low activation temperature is used to introduce the initial low level of curing, while larger quantities of one or more peroxides with higher activation temperatures are used for the subsequent curing (cure stage 2). The inclusion of crosslinkers, such as hydrogen siloxanes, can also be used to further modify the curing behaviour of the formulation.

The gas saturation process preferably takes place in an autoclave at a temperature below the activation temperature of the higher temperature curing agent in order in order to avoid over-curing the material prior to expansion. The initial low level of curing (cure stage 1) may be introduced by either operating the saturation process at a temperature and for sufficient time to achieve the required level of curing during gas saturation, or, preferably, by pre-curing the material for a specific time at a specific temperature prior to the saturation process. In the former process described here it is important to note that both the curing time and the saturation time for the material at the process temperature need to be taken into consideration in order to achieve full saturation without excessive curing resulting. In the latter process, gas saturation may take place below the activation temperature of any of the curing agents, in which case the level of curing is independent of the saturation time.

In a preferred embodiment a combination of three curing agents (most preferably thermally activated peroxides, one low temperature and two high temperature), have been used to achieve the desired curing behaviour. The initial low level of curing (cure stage 1) may be achieved by subjecting the material to a temperature above the recommended cure temperature of the low temperature peroxide but below the safe processing temperatures of the two high temperature peroxides. The three peroxides are preferably such that the processing temperature of the lower temperature peroxide does not overlap with the processing temperatures of the higher temperature peroxides. It should also be recognised that the processing temperatures of the higher temperature peroxides might be reduced by the presence of decomposition products from the lower temperature peroxide.

The precise combination of temperature and time required to achieve the desired low level of curing (cure stage 1) is preferably determined by experiment for a given combinations of peroxides. In a preferred embodiment it was found that by using a temperature of 100° C. it was possible to vary the cure time from 30 to 90 minutes with no significant effect on final foam density under the same processing conditions. This combination of temperature and time was, therefore, considered to be sufficient to react fully the lower temperature peroxide without activating the higher temperature peroxides.

Once the material is saturated with the gas, the pressure in the autoclave is preferably reduced to atmospheric pressure, thereby causing the material to expand in volume. The expansion may be restricted (such as expanding between plates or in a mould) or free (no restriction). The resulting foam must then be cured (cure stage 2) rapidly at an elevated temperature in order to stabilise the foam and prevent structural collapse of the foam. A final post-curing operation may also be employed (cure stage 3) to remove any residual volatiles or reaction products that may remain.

In order to achieve a stable foam after expansion it is necessary to fully cure the material as soon as possible. Failure to cure the material (cure stage 2) after foam expansion results in a gradual collapse and thereby densification of the foam over time. In the preferred embodiment, thermally activated peroxides are used as the curing agents for the silicone although it is also envisaged that other curing Systems could potentially be used, for example, a platinum curing system or a microwave active curing system.

A number of process and formulation variables may be used to control the foam density and cell structure. These variables include varying the formulation, varying the level of pre-cure (cure stage 1), varying the saturation gas pressure in the autoclave, varying the saturation temperature in the autoclave, varying the rate of pressure reduction from the saturation gas pressure to atmospheric pressure, varying the cure temperature (cure stage 2), varying the period between expansion and curing or any combination of the above. It is also possible to physically restrict the dimensions of the foam during either the expansion or the curing stages of the process, for example, by using a mould comprising parallel plates set a fixed distance apart or by using a mould of a fixed volume.

EXAMPLES

| Materials | |
|---|---|
| *Crosslinker E: | Bis(2,4-dichlorobenzoyl)peroxide (50%) |
| Crosslinker C1: | Dicumyl peroxide (98%) |
| Crosslinker C6 | 2,5-Bis(tert-butylperoxy)-2,5-dimethylhexane (45%) |
| Crosslinker 525: | hydrogenpolysiloxane |
| Flame Retardancy Additive SB-1: | platinum based compound |

Example 1

The base silicone gum selected was a high tear strength grade, Elastosil R420/60 (Wacker-Chemie), and to this was added 0.2 pphr ("pphr" means "parts per hundred parts of base") of the low activation temperature peroxide, Crosslinker E* (Wacker-Chemie), and 1.3 pphr and 3.7 pphr of the higher activation temperature peroxides C1* and C6* (Wacker-Chemie) respectively. The formulation was thoroughly mixed on a two-roll mill at ambient temperature. The material was removed from the mill in the form of a thick sheet (nominal 10 mm) which was then cut to size.

The cut sheet was placed on a tray inside an autoclave.

The autoclave was then pressurised to 400 bar with nitrogen, during which time the temperature was also increased to the processing temperature of 80° C. The material was allowed to saturate for 3 hours in the autoclave before the pressure was released to atmospheric pressure in less than 3 minutes. The expanded material was taken from the autoclave and placed in an air-circulating oven at 220° C. for one hour to cure. The density of the expanded material increased during curing (cure stage 2) and post-curing (cure stage 3) but then decreased again over a period of a few days before the foam stabilised to a final density of 50 kg/m$^3$. The foam exhibited a consistent, fine, closed-cell structure.

Example 2

The base silicone gum selected was a low smoke/low toxicity grade, Elastosil R770/50 (Wacker-Chemie), and to this was added 0.4 pphr of the low activation temperature peroxide, Crosslinker E* (Wacker-Chemie), and 1.0 pphr and 3.3 pphr of the higher activation temperature peroxides C1* and C6* (Wacker-Chemie) respectively. The formulation was thoroughly mixed on a two-roll mill at ambient temperature. The material was removed from the mill in the form of a thick sheet (nominal 10 mm) which was then cut to size.

The cut sheet was placed on a tray inside an autoclave.

The autoclave was then pressurised to 300 bar with nitrogen, during which time the temperature was also increased to the processing temperature of 90° C. The material was allowed to saturate for 3 hours in the autoclave before the pressure was released to atmospheric pressure in less than 3 minutes. The expanded material was taken from the autoclave and placed in an air-circulating oven at 220° C. for one hour to cure. The density of the expanded material increased during curing (cure stage 2) and post-curing (cure stage 3) but then decreased again over a period of a few days before the foam reached a final density of 110 kg/m$^3$. The foam exhibited a consistent, fine, closed-cell structure.

Example 3

Two low hardness base silicone gums were blended together, Elastosil R401/20 (Wacker-Chemie) and Elastosil R401/30 (Wacker-Chemie), and to these were added 0.2 pphr of the low activation temperature peroxide, Crosslinker E* (Wacker-Chemie), and 2.5 pphr of the higher activation temperature peroxide C6* (Wacker-Chemie). The formulation was thoroughly mixed on a two-roll mill at ambient temperature. The material was removed from the mill in the form of a thick sheet (nominal 10 mm) which was then cut to size.

The cut sheet was placed on a tray inside an autoclave.

The autoclave was then pressurised to 670 bar with nitrogen, during which time the temperature was also increased to the processing temperature of 85° C. The material was allowed to saturate for 3 hours in the autoclave before the pressure was released to atmospheric pressure in less than 3 minutes. The expanded material was taken from the autoclave and placed in an air-circulating oven at 220° C. for 20 minutes to cure. The density of the expanded material increased during curing (cure stage 2) and post-curing (cure stage 3) but then decreased again over a period of a few days before the foam reached a final density of 95 kg/m$^3$. The foam exhibited a consistent, very fine, closed-cell structure.

Example 4

The base silicone gum selected was a general purpose cable grade, Elastosil R502/70 (Wacker-Chemie), and to this was added 0.2 pphr of the low activation temperature peroxide, Crosslinker E* (Wacker-Chemie), and 1.3 pphr and 3.7 pphr of the higher activation temperature peroxides C1* and C6* (Wacker-Chemie) respectively. The formulation was thoroughly mixed on a two-roll mill at ambient temperature. The material was removed from the mill in the form of a thick sheet (nominal 10 mm) which was then cut to size.

The cut sheet was placed in a mould, comprising two parallel plates set 22 mm apart, inside an autoclave.

The autoclave was then pressurised to 400 bar with nitrogen, during which time the temperature was also increased to the processing temperature of 80° C. The material was allowed to saturate for 3 hours in the autoclave before the pressure was released to atmospheric pressure in less than 3 minutes. The material expanded into the gap between the plates, thereby limiting the thickness. The expanded material was taken from the autoclave still in the mould and placed in an air-circulating oven at 220° C. for one hour to cure. The density of the expanded material increased during curing (cure stage 2) and post-curing (cure stage 3) but then decreased again over a period of a few days before the foam reached a final density of 115 kg/m$^3$. The foam exhibited a consistent, fine, closed-cell structure.

Example 5

The base silicone gum selected was a high tear strength grade, Elastosil R420/60 (Wacker-Chemie), and to this was added 0.2 pphr of the low activation temperature peroxide, Crosslinker E* (Wacker-Chemie), and 1.3 pphr and 3.7 pphr of the higher activation temperature peroxides C1* and C6* (Wacker-Chemie) respectively. The formulation was thoroughly mixed on a two-roll mill at ambient temperature. The material was removed from the mill in the form of a thick sheet (nominal 10 mm) which was then cut to size.

The cut sheet was placed in an air circulating oven and pre-cured (cure stage 1) for 60 minutes at a temperature of 100° C.

The pre-cured sheet was then placed on a tray inside an autoclave which was pressurised to 670 bar with nitrogen. During pressurisation the temperature was raised to the processing temperature of 55° C. and the material was allowed to saturate for 4 hours before the pressure was released to atmospheric pressure in less than 3 minutes. The density of the expanded material increased during curing (cure stage 2) and post-curing (cure stage 3) but then decreased again over a period of a few days before the foam reached a final density of 100 kg/m$^3$. The foam exhibited a consistent, fine, closed-cell structure.

Example 6

The base silicone gum selected was a high tear strength grade, Elastosil R420/60 (Wacker-Chemie), and to this was added 0.2 pphr of the low activation temperature peroxide, Crosslinker E* (Wacker-Chemie), and 1.3 pphr and 3.7 pphr of the higher activation temperature peroxides C1* and C6* (Wacker-Chemie) respectively. The formulation was thoroughly mixed on a two-roll mill at ambient temperature. The material was removed from the mill in the form of a thin sheet. This was cut into strips and fed into a cold feed extruder to form a slab 11 mm thick.

The cut slab was placed in an air circulating oven and pre-cured (cure stage 1) for 60 minutes at a temperature of 100° C.

The cut slab was placed on a tray inside an autoclave.

The autoclave was then pressurised to 300 bar with nitrogen, during which time the temperature was also increased to the processing temperature of 55° C. The material was allowed to saturate for 4 hours in the autoclave before the pressure was released to atmospheric pressure in less than 3 minutes. The expanded material was taken from the autoclave and placed in an air-circulating oven at 220° C. for one hour to cure. The density of the expanded material increased during curing (cure stage 2) and post-curing (cure stage 3) but then decreased again over a period of a few days before the foam stabilised to a final density of 50 kg/m$^3$. The foam exhibited a consistent, fine, closed-cell structure.

Example 7

The base silicone gum selected was a high tear strength grade, Elastosil R420/60 (Wacker-Chemie), and to this was added 0.2 pphr of the low activation temperature peroxide, Crosslinker E* (Wacker-Chemie), and 1.3 pphr and 3.7 pphr of the higher activation temperature peroxides C1* and C6* (Wacker-Chemie) respectively. The formulation was thoroughly mixed on a two-roll mill at ambient temperature. The material was removed from the mill in the form of a thin sheet. This was cut into strips and fed into a cold feed extruder to form a slab 11 mm thick.

The cut slab was placed in an air circulating oven and pre-cured (cure stage 1) for 60 minutes at a temperature of 100° C.

The cut slab was placed on a tray inside an autoclave.

The autoclave was then pressurised to 300 bar with nitrogen, during which time the temperature was also increased to the processing temperature of 65° C. The material was allowed to saturate for 2.5 hours in the autoclave before the pressure was released to atmospheric pressure in 15 minutes. The expanded material was taken from the autoclave and placed in an air-circulating oven at 220° C. for one hour to cure. The density of the expanded material increased during curing (cure stage 2) and post-curing (cure stage 3) but then decreased again over a period of a few days before the foam stabilised to a final density of 100 kg/m$^3$. The foam exhibited a consistent, noticeable coarser, closed-cell structure.

Example 8

The base silicone gum selected was a high tear strength grade, Elastosil R420/60 (Wacker-Chemie), and to this was added 0.2 pphr of the low activation temperature peroxide, Crosslinker E* (Wacker-Chemie), and 1.0 pphr and 2.8 pphr of the higher activation temperature peroxides C1* and C6* (Wacker-Chemie) respectively. The formulation was thoroughly mixed on a two-roll mill at ambient temperature. The material was removed from the mill in the form of a thin sheet. This was cut into strips and fed into a cold feed extruder to form a slab 13 mm thick.

The cut slab was placed in an air circulating oven and pre-cured (cure stage 1) for 60 minutes at a temperature of 100° C.

The cut slab was placed on a tray inside an autoclave.

The autoclave was then pressurised to 300 bar with nitrogen, during which time the temperature was also increased to the processing temperature of 55° C. The material was allowed to saturate for 4 hours in the autoclave before the pressure was released to atmospheric pressure in less than 2 minutes. The expanded material was taken from the autoclave and placed in an air-circulating oven at 220° C. for one hour to cure. The density of the expanded material increased during curing (cure stage 2) and post-curing (cure stage 3) but then decreased again over a period of a few days before the foam stabilised to a final density of 60 kg/m$^3$. The foam exhibited a consistent, fine, closed-cell structure.

Example 9

The base silicone gum selected was a high tear strength grade, Elastosil R420/60 (Wacker-Chemie) plus flame retardancy additive SB-1 at 2.2 pphr, and to this was added 0.4 pphr of the low activation temperature peroxide, Crosslinker E* (Wacker-Chemie), and 1.3 pphr and 3.7 pphr of the higher activation temperature peroxides C1* and C6* (Wacker-Chemie) respectively. The formulation was thoroughly mixed on a two-roll mill at ambient temperature. The material was removed from the mill in the form of a thin sheet. This was cut into strips and fed into a cold feed extruder to form a slab 11 mm thick.

The cut slab was placed in an air circulating oven and pre-cured (cure stage 1) for 60 minutes at a temperature of 100° C.

The cut slab was placed on a tray inside an autoclave.

The autoclave was then pressurised to 300 bar with nitrogen, during which time the temperature was also increased to the processing temperature of 55° C. The material was allowed to saturate for 4 hours in the autoclave before the pressure was released to atmospheric pressure in less than 3 minutes. The expanded material was taken from the autoclave and placed in an air-circulating oven at 220° C. for one hour to cure. The density of the expanded material increased during curing (cure stage 2) and post-curing (cure stage 3) but then decreased again over a period of a few days before the foam stabilised to a final density of 60 kg/m$^3$. The foam exhibited a consistent, fine, closed-cell structure.

Example 10

The base silicone gum selected was a high tear strength grade, Elastosil R420/60 (Wacker-Chemie) plus Crosslinker 525 at 1.5 pphr, and to this was added 0.2 pphr of the low activation temperature peroxide, Crosslinker E* (Wacker-Chemie), and 1.3 pphr and 3.7 pphr of the higher activation temperature peroxides C1* and C6* (Wacker-Chemie) respectively. The formulation was thoroughly mixed on a two-roll mill at ambient temperature. The material was removed from the mill and formed into a slab 16 mm thick.

The cut slab was placed in an air circulating oven and pre-cured (cure stage 1) for 60 minutes at a temperature of 100° C.

The cut slab was placed on a tray inside an autoclave.

The autoclave was then pressurised to 300 bar with nitrogen, during which time the temperature was also increased to the processing temperature of 55° C. The material was allowed to saturate for 6 hours in the autoclave before the pressure was released to atmospheric pressure in less than 3 minutes. The expanded material was taken from the autoclave and placed in an air-circulating oven at 220° C. for one hour to cure. The density of the expanded material increased during curing (cure stage 2) and post-curing (cure stage 3) but then decreased again over a period of a few days before the foam stabilised to a final density of 90 kg/m$^3$.

The invention claimed is:

1. A process for making closed cell silicone foam comprising the steps of:
    a1) partially curing a silicone base by mixing the base with a curing agent to yield a silicone base precursor, then
    a2) placing the silicone base precursor in an autoclave and subjecting the silicone base precursor to at least one inert gas at a pressure higher than atmospheric in order to drive gas into it, then
    b) within the autoclave, reducing the pressure in order to expand the silicone base to produce closed cell silicone foam, and then
    c) curing the expanded silicone foam, wherein at least two curing agents are employed, a first curing agent for step a1) and a second curing agent for step c), and wherein the first curing agent can be activated without activating the second curing agent, wherein closed cell silicone foam is formed.

2. A process as claimed in claim 1, wherein the first and second curing agents are thermally activated.

3. A process as claimed in claim 2, wherein the activation temperature of the first curing agent is lower than that of the second curing agent, and wherein steps a1) and a2) take place at a temperature lower than the activation temperature of the second curing agent.

4. A process as claimed in claim 1, wherein the curing agents are peroxide compounds.

5. A process as claimed in claim 1, wherein there is a single curing agent for step a1) and two curing agents for step c).

6. A process as claimed in claim 1, wherein the proportion of the first curing agent employed is from 5 to 80% of the amount required to cure fully the silicone base.

7. A process as claimed in claim 1, wherein the proportion of the first curing agent employed is from 10 to 40% of the amount required to cure fully the silicone base.

8. A process as claimed in claim 1, wherein curing step c) is carried out at atmospheric pressure.

9. A process as claimed in claim 1, wherein in step b) the expanding foam is constrained as it expands in order to shape the resulting product.

10. A process as claimed in claim 1 in which the pressure is lowered to atmospheric in step b).

11. A process as claimed in claim 1 in which the silicone base is extruded into the form of a sheet prior to step a2).

12. A process as claimed in claim 1 in which in step a2) the pressure is from 20 to 1000 bar.

13. A closed cell silicone foam produced by a process comprising:
- a1) partially curing a silicone base by mixing the base with a curing agent to yield a silicone base precursor, then
- a2) placing the silicone base precursor in an autoclave and subjecting the silicone base precursor to at least one inert gas at a pressure higher than atmospheric in order to drive gas into it, then
- b) within the autoclave, reducing the pressure in order to expand the silicone base to produce closed cell silicone foam, and then
- c) curing the expanded silicone foam, wherein at least two curing agents are employed, a first curing agent for step a1) and a second curing agent for step c), and wherein the first curing agent can be activated without activating the second curing agent, wherein a closed-cell silicone foam is formed.

* * * * *